Sept. 22, 1970  F. K. IBRAHIM ET AL  3,530,345
SYSTEM AND INTEGRAL STRUCTURE OF AN ANGULAR POSITIONING
AND TORQUE OUTPUT SERVOMECHANISM
Filed Jan. 23, 1967

INVENTORS
Faik K. Ibrahim
Sven E. Braaten

BY

*Edward H. Loneman*

ATTORNEY

United States Patent Office 3,530,345
Patented Sept. 22, 1970

3,530,345
SYSTEM AND INTEGRAL STRUCTURE OF AN ANGULAR POSITIONING AND TORQUE OUTPUT SERVOMECHANISM
Faik K. Ibrahim, Pacific Palisades, and Sven E. Braaten, Torrance, Calif., assignors to Vernitron Corporation, Farmingdale, N.Y., a corporation of New York
Filed Jan. 23, 1967, Ser. No. 610,921
Int. Cl. G05b 11/12
U.S. Cl. 318—30
1 Claim

ABSTRACT OF THE DISCLOSURE

This invention relates to servo systems and in particular, to a compact servomechanism adapted to convert synchro input signals into output torque. Specifically, it concerns a closed housing having a torque motor and a synchro transformer mounted on the same shaft and an amplifier for producing accurate angular shaft rotation as a result of input signal transmission data supplied to the synchro transformer.

---

This invention relates generally to improvements in servo systems and, in particular, to a more compact and simplified component arrangement for an angular positioning servomechanism.

Angular positioning servomechanisms are key links in electromechanical control systems for correcting low level electrical signals into corresponding shaft positions at relatively high torque levels. Although, in general, these known devices or servo systems have proven themselves to be suitable for their specific intended functional purposes, their very complexity is a major drawback and subject to various disadvantages. Specifically, the prior art devices and systems have been constituted of an assembly of electric motor and damping means, feedback transducers, precision gearing, preamplifiers and other miscellaneous components, such as internal gear trains and the like. It becomes readily obvious that each and every one of the components must be suitably housed and attended to in the circuit, which in turn involves great difficulties in the design, packaging and maintenance of the servo systems.

Furthermore, certain of the prior art devices or systems have been proven to be quite limited in their operating ranges and accuracies, and often incapable of satisfactory operable connection to other similar devices in the same system. Thus, for example, insufficient power has been available in prior art torque receivers for accurate angular displacement of the positioning shafts thereof when connected in parallel with a plurality of other similar torque receivers when utilized with a number of instruments. Other disadvantages encountered in the prior art devices have been difficulties in maintaining extremely accurate torque output measurements, and an undue degree of sensitivity to extreme temperature changes.

The present invention overcomes the foregoing and other disadvantages encountered in the prior art by providing a compact self-contained servo system adapted to produce a predetermined output angle with high torque, in response to an input signal transmission. In essence, the servo system is contained in a single compactly assembled unit and is comprised of an electrical rotary actuator, a feedback transducer coupled to the rotor of the electrical actuator through an integral shaft arrangement, and an amplifier. These components, when assembled in a common housing, constitute a self-contained remotely controlled angular positioning and tracking servomechanism for converting input synchro data to an accurate shaft position. The utilization of these components results in a torque servo system superior to prior art systems in regard, amongst other attributes, to the following:

(a) Higher output torque capability thereby operating under loading conditions not previously possible with prior art torque receivers.

(b) Larger acceleration capability leading to faster response to input signal transmissions.

(c) Greater accuracy and more precise angular positioning of shaft achieved without additional feedback and control required due to absence of gearing.

(d) High input impedance thereby permitting utilization of several torque receivers in parallel in same servo system without any appreciable effect on loading.

(e) Large degree of insensitivity to frequency and voltage changes thus permitting fluctuations in voltages and frequency supplied to the servo-mechanism without affecting accuracy of the angular position of the instrument or the output torque.

From the foregoing and the following detailed description, it becomes evident that the servo system or servomechanism of the present invention eliminates extensive individual components each requiring calibration, and replaces them with a simplified unit assembly requiring minimum maintenance, and having superior operating characteristics.

Accordingly, it is a primary object of the present invention to provide a self-contained, compact servo system adapted to convert an input signal transmission into an output torque.

Another object of the present invention is to provide a compact servo system including a self-contained unit having an angularly positional shaft for transmitting a torque in response to a synchro date input transmission signal.

A still further object of the present invention is to provide a servomechanism including a self-contained unit having an amplifier, rotary actuator and feedback transducer to generate an output torque in response to an input signal.

These and other objects and many of the attendant advantages of this invention will be readily appreciated as the same becomes better understood by reference to the following detailed description when considered in connection with the accompanying drawing in which.

Figure 1:
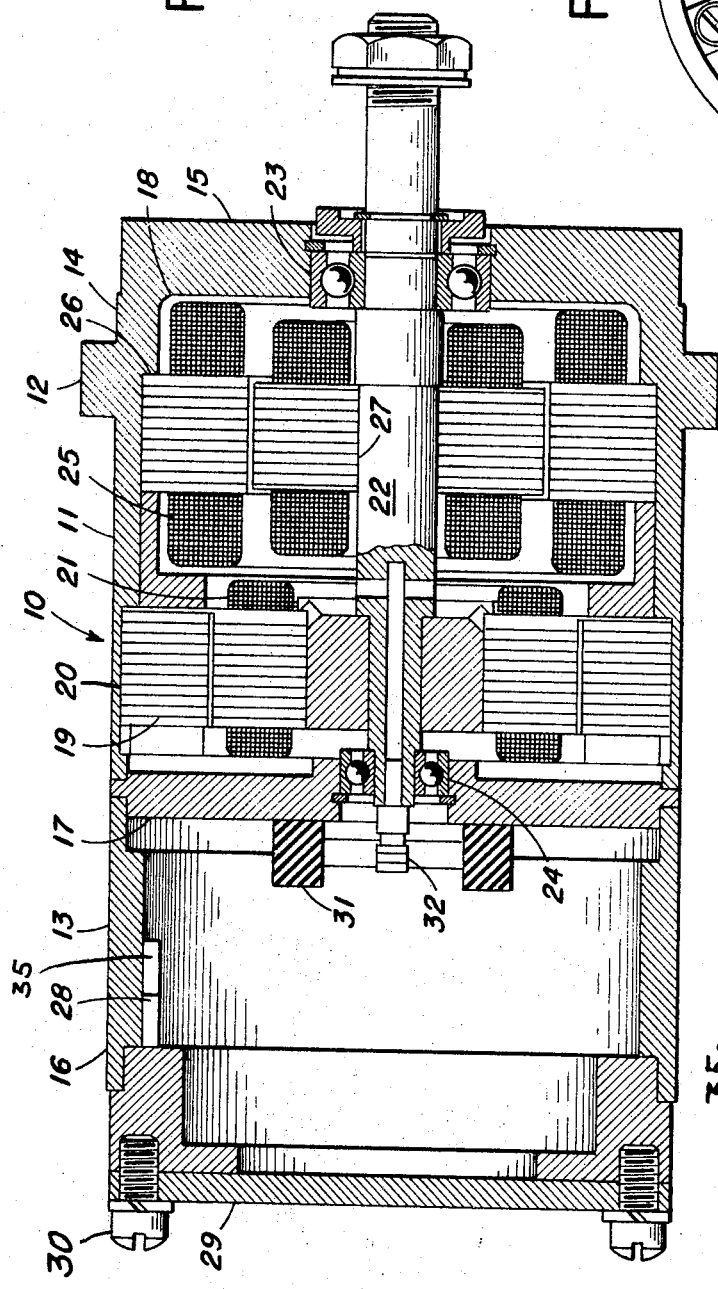
FIG. 1 is a side elevational view in section of a servo system according to the present invention.

Referring now to the drawings wherein like reference characters designate like or corresponding parts throughout, there is illustrated in FIG. 1 a servo system or servomechanism 10 embodying torque measuring and angular deflection means in accordance with the present invention. The servomechanism 10 comprises a housing 11 which may consist of a section 12 and a second section 13. Section 12 of the housing includes a substantially cylindrical portion 14 and a radially inwardly depending flange portion 15.

Similarly, section 13 of housing 11 includes a substantially cylindrical portion 16 and a radially inwardly depending flange portion 17, thus in effect, forming a chamber 18 between flanges 15 and 17 for containing a rotary actuator such as D.C. electric torque motor 19.

Torque motor 19 is comprised of a stator portion 20 fastened to housing portion 12 and positioned within chamber 18, with the stator 20 being stationary relative to the housing 11. The motor 19 has a rotor portion 21 positioned radially inward of stator 20. For example, a suitable electric motor which may be employed is of the type shown in U.S. Pat. No. 3,249,780, issued May 3, 1966 to F. K. Ibranhim et al. Rotor 21 is mounted on, and rotatable with a shaft 22, the latter of which is journaled in bearings 23 and 24. A portion of shaft 22 protrudes exteriorly of housing 11 to thereby provide an attaching portion for a torque measuring instrument load, or the like (not shown). Bearings 23 and 24 are each respectively mounted in suitable apertures provided in flanges 15 and 17.

Also contained in housing 11 is a feedback transducer or synchro control transformer 25 which is comprised of a stator 26 fastened to housing 11 and a rotor 27 mounted on shaft 22 and positioned adjacent to torque motor 19. Similarly, an amplifier 28 is positioned within the housing 11 exteriorly of chamber 18 and adjacent to the torque motor 19. The amplifier 28, which is a solid state servo motor amplifier well known in the art, is mounted stationarily with respect to housing 11, and retained in position by means of a closure plate 29. The closure plate 29 is attached to section 13 of the housing 11 through suitable fastening means 30. A brush block 31 and slip rings 32 may be utilized to provide the required electrical connection between the input to amplifier 20 and the synchro transformer output of the servo system 10.

Throughout the assembly, suitable retaining rings and spacers may be employed to position the individual components within housing 11 in a manner well known in the art.

Figure 2:
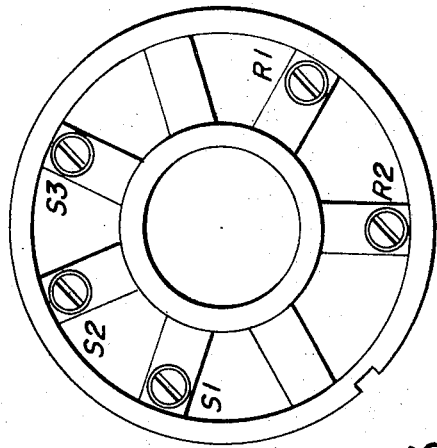
FIG. 2 is an end view of the servo system illustrated in FIG. 1.

Referring to the drawings in connection with FIG. 2, the $S_1$, $S_2$ and $S_3$ terminals of servomechanism assembly 10 are connected to the stator 26 of the synchro transformer 25, while the $R_1$ and $R_2$ terminals are connected internally to a power supply 35 and externally connected to a suitable source of AC power. The amplifier 28 has a demodulator and the usual stabilization networks to convert and amplify the AC input signals from the synchro transformer 25 to a DC signal in an efficient, smooth and stable manner.

Figure 3:
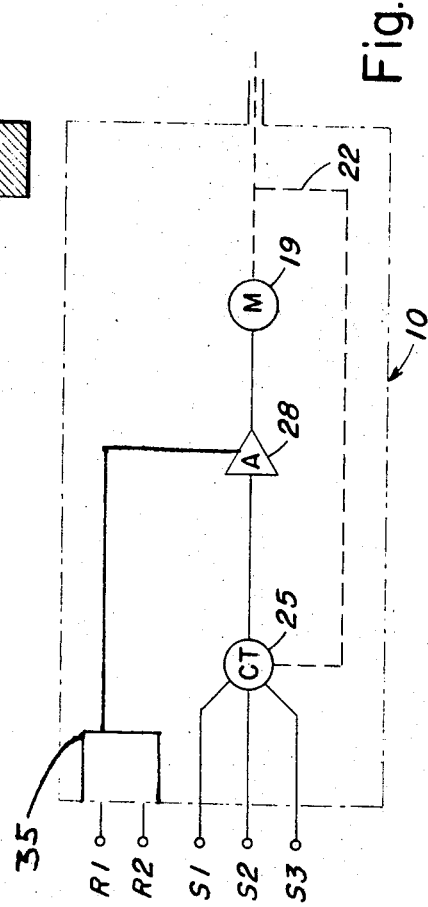
FIG. 3 is a schematic diagram of the servo system illustrated in FIG. 1.

Referring to FIG. 3 an input signal from a synchro such as a synchro transmitter (not shown) is applied to the terminals $S_1$, $S_2$ and $S_3$ of the stator 26 of control transformer 25. The output signal from the control transformer rotor 27 is applied via slip rings 32 to amplifier 28 and supplied to the rotor 21 of motor 19. Motor 19 rotates shaft 22 until the output of rotor 27 of control transformer 25 is zero whereby the motor 19 stops and the angular position of shaft 22 has been displaced in accordance with the input signal. Quite clearly, the above described servo system presents a simplified approach and construction in relation to prior art torque servo-systems, and is adapted to operate in frequency ranges of 50 to 440 Hz. under variable voltage and environmental conditions without appreciable effect on the efficiency of the servo system. Moreover, this servo system is capable of generating torques and thus may be driven from small low torque synchro transmitters without performance degradation. Additionally, the gear train which heretofore has been found in this type of instrument servo system has been excluded, thereby eliminating backlash and jitter and providing smooth tracking, reliability, very low motor speeds and a large range of acceleration capability.

Although the aforedescribed invention has been described with reference to a servo system for the angular positioning of a shaft in response to an input torque transmitter, it will be readily apparent to one skilled in the art that the invention may be applied to many other uses and functions.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:
1. A servo system for converting received signals from a transmitting means into a torque output by angularly positioning a torque output shaft, said system comprising:
  a housing means comprising,
  a substantially cylindrical hollow member, said member having at one end thereof an integral end wall with a cylindrical opening therein and a removable end wall at the other end, said member also having first and second spaced-apart radially inwardly depending flanges, said integral end wall and said second depending flange having a bearing means positioned therein,
  a shaft supported on said bearings in said housing and having a portion thereof protruding from said housing through said integral end wall,
  a DC torque motor having a stator and a rotor and positioned in said housing between said first and second flanges, said torque motor rotor being mounted on said shaft,
  a synchro controlled transformer positioned in said housing between said integral end wall and said first flange, said transformer including a stator, electrically coupled to said transmitting means and a transformer rotor mounted on said shaft,
  an amplifier positioned in said housing adjacent said removable end wall, the input to said amplifier being electrically connected to said transformer rotor and the output of said amplifier being electrically coupled to energize said torque motor such that upon receiving a signal from said transmitting means said transformer transmits said signals to said amplifier which causes said torque motor to rotate until the signal from said transformer to said amplifier is reduced to zero whereby said shaft is angularly displaced to a position corresponding to the value of said received signals.

References Cited

UNITED STATES PATENTS

| 2,448,374 | 8/1948 | Kent | 310—112 |
| 2,514,555 | 7/1950 | Noxon | 318—30 |
| 2,885,614 | 5/1959 | Harris | 318—30 |
| 2,996,650 | 8/1961 | Roberti et al. | 310—113 X |
| 3,166,685 | 1/1965 | Hargreaves | 310—112 X |
| 3,170,079 | 2/1965 | Jaeschke | 310—68 X |
| 3,201,669 | 8/1965 | Hollmann | 318—30 |
| 3,205,421 | 9/1965 | Webb | 310—68 X |

THOMAS E. LYNCH, Primary Examiner

U.S. Cl. X.R.

310—68, 113